No. 620,754. Patented Mar. 7, 1899.
B. DOYLE.
PNEUMATIC TIRE.
(Application filed Jan. 18, 1898.)
(No Model.)
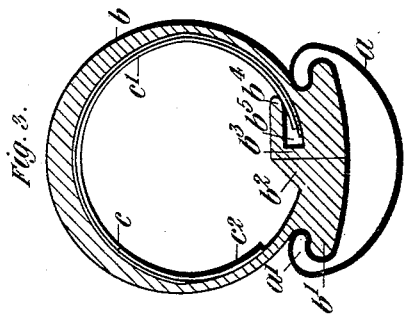
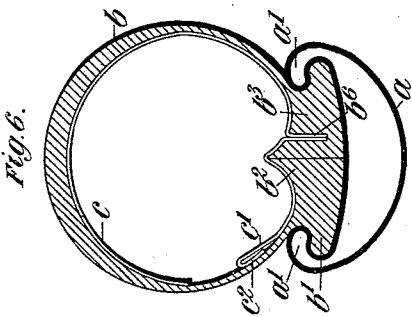
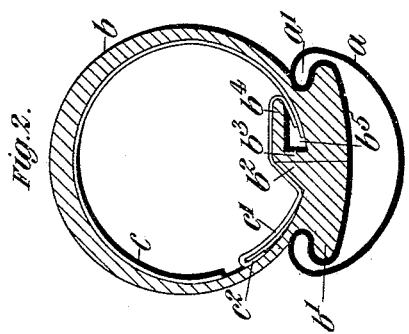
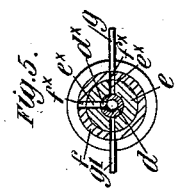
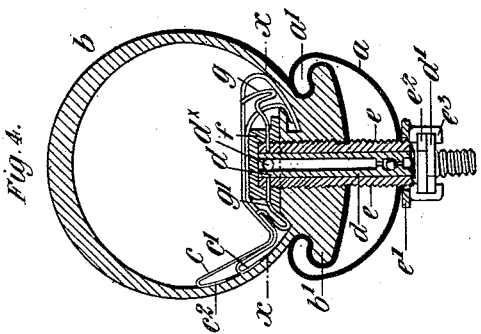
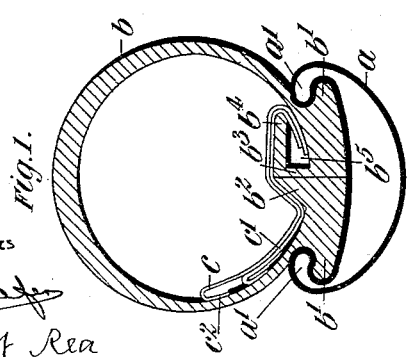
Witnesses
Inventor
Brisbane Doyle
By James L. Norris
Atty

UNITED STATES PATENT OFFICE.

BRISBANE DOYLE, OF LONDON, ENGLAND.

PNEUMATIC TIRE.

SPECIFICATION forming part of Letters Patent No. 620,754, dated March 7, 1899.

Application filed January 18, 1898. Serial No. 667,097. (No model.)

*To all whom it may concern:*

Be it known that I, BRISBANE DOYLE, engineer, a subject of the Queen of Great Britain, residing at 45 Lambeth road, London, England, have invented certain new and useful Improvements in and Connected with Pneumatic Tires and in Valves for Use Therewith, of which the following is a specification, reference being had to the accompanying drawings.

This invention relates to pneumatic tires, and has reference more especially to those which are known as "tubeless" tires, the object being to provide means whereby in the event of puncture the tire can be readily reinflated without any repairs being necessary, the said means being capable, if desired, of permitting the reinflation to be performed a number of times.

For the purpose of carrying out my invention I provide inside the tire one or more thin inflatable bands or linings, which, as long as the tire is properly distended, remain inoperative—that is to say, in an uninflated or collapsed condition on the side of the tire adjacent to the rim. The bands or linings are secured down one edge to the inside of the tire, and means are provided for detachably securing the free edges of the bands or linings to the opposite part of the tire, thus permitting of access to both sides of the tire when the latter is removed from the rim for repairs. The inflation-valve is so arranged that should the tire become punctured the band or lining, or one of them, can be inflated and will serve to cover up the puncture and to distend the tire again after the manner of an air-tube. Any desired number of such bands or linings may be employed and can be used in succession, so that after one has become punctured the next can be inflated, and so on.

Referring now to the accompanying drawings, Figure 1 illustrates in section a tubeless tire provided, according to my said invention, with two inner bands or linings, the latter being in an uninflated or inoperative condition. Fig. 2 is also a section showing one of the said linings in use—that is to say, inflated for the purpose of distending the tire, the latter being supposed to have been punctured. Fig. 3 is a similar section showing the inner lining also inflated, the outer lining and tire being both supposed to have been punctured. Fig. 4 is a section through the tire and the inflation-valve, illustrating means by which either the unpunctured tire or one or other of the linings may be inflated, as desired. Fig. 5 shows a detail of the said means in horizontal section on the line $x\ x$, Fig. 4. Fig. 6 is a section, analogous to that shown in Fig. 2, of a tire having a modified arrangement for holding the free edges of the bands or linings.

Referring more particularly to Figs. 1 to 5, $a$ is the rim of the wheel, and $b$ is the tire proper, the edges of which are provided with ridges or projections $b'$, adapted to fit under and engage the turned-over edges $a'$ of the rim. The edges of the tire abut against each other and form an air-tight joint, one of them having a tapered lip or edge $b^2$ and the other having a straight lip $b^3$, from which extends at right angles a horizontal projecting strip or tongue $b^4$, the edge of the said tongue projecting toward the inner surface of the tire, so that an air space or pocket $b^5$ is formed between it and the tire.

$c\ c'$ are the two bands or linings which are arranged inside the tire and may consist of extremely-thin materials or membranes of any suitable material impervious to air. Each band or lining is secured to the tire along one edge in any convenient manner at $c^2$, its other edge being turned under the tongue $b^4$ and being retained in this position by the air-pressure inside the tire. The edges of the bands or linings are placed under the tongue while the tire is open and previous to its being bent and fitted to the wheel-rim, and the bands or linings are made wide enough to permit of this being easily done.

Any suitable form of valve, such as $d$, may be employed for inflating my improved tire; but it is necessary to provide some adjustable means by which the air may be forced at will either into the unpunctured tire or into the first internal piece or lining after a puncture has occurred in the tire, or into the second lining after the first lining has also been punctured, or into any subsequent linings, if they be employed. The means which I prefer to employ for this purpose are as follows: $f$ is a flanged screw-cap which fits over the end of the valve-casing $e$ and is provided with three outlet-orifices $f^\times$, corresponding to three similar orifices $e^\times$, formed in the valve-casing. The flange of the cap bears on the inner part of the tire and is drawn tightly onto the same by the tightening up of the nut $e'$. The arrangement of the orifices is such that by turning the valve-body $d$ around its axis its outlet-orifice $d^\times$ can be brought opposite one or other of the orifices $e^\times$, so as to discharge air either into the tire itself or into one or other of the bands or linings $c\ c'$. The turning of the valve-body into the different positions is facilitated by a collar $d'$, which carries an index-mark and abuts against a similar collar $e^2$ on the valve-casing, this latter collar being furnished with marks or notches corresponding to the positions of the orifices $e^\times$. By bringing the mark on the collar $d'$ opposite one or other of the marks on the collar $e^2$ the outlet-orifice $d^\times$ can thus be brought with certainty opposite one or other of the orifices $e^\times$ in the casing $e$.

$e^3$ are fingers or clips secured to the said casing and serving to keep the collars together and prevent the valve slipping out of the casing.

$g\ g'$ are small communication-tubes, which serve to lead the air from the orifices to the points where it is to be discharged into the spaces to be inflated. In the present instance only two of these tubes are employed, these being fitted to two of the orifices $f^\times$ and $e^\times$, the third orifice being unprovided with such a tube. One of the tubes—viz., $g$—opens into the space between the tire and the lining $c$ and serves to inflate the tire directly without inflating either of the linings. The other tube, $g'$, opens into the space between the linings and serves to inflate the outer lining $c$, so as to cause it to act as an air-tube for distending the tire in the event of the latter being punctured. The orifice which is unprovided with a communication-tube opens directly into the space between the inner lining $c'$ and the tire and serves to distend the lining $c'$ in the manner indicated in Fig. 2.

In using a tire provided with my present improvements the linings $c\ c'$ are, as stated, placed beneath the tongue $b^4$ before the tire is fitted to the wheel-rim. The valve-body $d$ is then turned into such a position as to bring the orifice $d^\times$ opposite the orifices leading to the communication-tube $g$. When, therefore, the air-pump is operated, the air finds its way directly into the tire, the linings $c\ c'$ remaining in a collapsed condition, as in Fig. 1.

In the event of a puncture occurring in the tire the valve-body is turned so as to bring the orifice $d^\times$ into communication with the tube $g'$, which leads into the space between the bands or linings. Then by operating the air-pump the lining $c$ is inflated and serves to distend the tire after the manner of an air-tube, as shown in Fig. 2.

If a second puncture should occur, it is only necessary to turn the orifice $d^\times$ opposite the third of the orifices $e^\times\ f^\times$, so as to direct the air between the tire and the lining $c'$, and thus inflate the latter and redistend the tire, as indicated in Fig. 3.

The tongue $b^4$, as will be readily understood, depends for its action on the air inside the tire, which causes it to hold the turned-under edges of the bands or linings firmly in position.

In case any air should get under the tongue $b^4$ it will accumulate in the space or pocket $b^5$ and will serve to press the lip $b^3$ more firmly against the lip $b^2$, thus diminishing the risk of leakage between the said lips.

In the modified arrangement shown in Fig. 6 the tongue $b^4$ and pocket $b^5$ are dispensed with and the lips $b^2$ and $b^3$ are substantially similar to each other in form. The lip $b^3$ is, however, provided with a vertical slit or cavity $b^6$, into which the ends of the bands or linings $c\ c'$ are inserted. The compression of the thickened edges of the tire in the wheel-rim thus serves to close the slit $b^6$ tightly onto the bands or linings and causes the latter to be nipped and retained securely therein.

What I claim is—

1. The combination with a tubeless pneumatic tire, of bands or linings attached at one of their edges to the interior surface of the tire at one side thereof, and means for detachably securing the other edges of said bands to the opposite side of the tire, substantially as described.

2. The combination of a tubeless pneumatic tire, lips on the edges of said tire, a tongue projecting at right angles to one of said lips, bands or linings inside the tire secured thereto along one side, and having the edges at the other side folded under the said tongue, and means for inflating said tire and linings independently of each other, substantially as described.

In testimony whereof I have hereunto set my hand this 4th day of January, 1898.

BRISBANE DOYLE.

Witnesses:
CHAS. B. BURDON,
H. ASHLEY NORRIS.